United States Patent [19]
Noguchi

[11] 3,754,167
[45] Aug. 21, 1973

[54] SOLENOID

[75] Inventor: Masaru Noguchi, Tokyo, Japan
[73] Assignee: Alps Motorola, Inc., Tokyo, Japan

[22] Filed: Nov. 26, 1971
[21] Appl. No.: 202,319

[52] U.S. Cl. .............................. 317/151, 317/155.5
[51] Int. Cl. .............................. H01h 47/00
[58] Field of Search .............................. 317/150, 151, 155.5

[56] References Cited

UNITED STATES PATENTS

| | | | |
|---|---|---|---|
| 3,082,358 | 3/1963 | Gratzmuller | 317/151 |
| 3,129,371 | 4/1964 | Bourguignon | 317/151 |
| 1,888,427 | 11/1932 | Durkee | 317/151 |
| 3,361,939 | 1/1968 | Smith | 317/155.5 |

*Primary Examiner*—L. T. Hix
*Attorney*—Foorman L. Mueller, James W. Gillman and La Valle D. Ptak et al.

[57] ABSTRACT

An energizing circuit for a solenoid includes a source of DC power connected normally to a capacitor for charging the latter. Upon closing a normally open switch coupled electrically to the coil of the solenoid, both the DC power supply and charged capacitor are connected electrically to the solenoid coil to provide initially a relatively large magnetic field for operating the solenoid.

2 Claims, 6 Drawing Figures

SOLENOID

BACKGROUND

This invention relates generally to solenoids and in particular to energizing circuits therefor.

In a multi-track cartridge or the like tape player, it is necessary to index the magnetic tape head which records and/or reproduces information on a magnetic tape in a cartridge received in the player. To do so, a tape head indexing assembly is provided. Conventionally, such assemblies include a cam member having a plurality of cam surfaces which upon rotation of the cam come into engagement with a cam follower for movement of the latter into engagement with the tape head to position the head with respect to the various tracks on the tape.

Circuitry including a solenoid is often employed to drive the cam in a rotary path in a stepped fashion. The circuitry conventionally includes a DC power supply connected in series with the operating coil of the solenoid and with a switch. Closing of the switch causes the energization of the solenoid coil by the DC power supply. The solenoid used, however, is normally large and requires a relatively high power consumption to provide the necessary force to rotate the cam sufficiently to index the head between tape tracks.

SUMMARY

Accordingly, it is an object of the present invention to provide an energizing circuit which provides, through a solenoid included therein, relatively high force output with a relatively small amount of power consumption.

It is another object of the invention to provide an arrangement of the above described type which may be used in a cartridge or the like tape player in conjunction with and for driving the tape head indexing assembly thereof.

Briefly, a preferred embodiment of the circuitry according to the invention includes a solenoid having an electromagnetic coil, a movable core portion and a stationary core portion. a capacitor is normally coupled electrically to a source of DC power and is charged thereby. a switching arrangement connected to the solenoid coil is operable to couple the latter to both the DC power source and charged capacitor, thereby to energize the coil from both. Initially, a relatively large magnetic field is produced to move the movable core portion toward the stationary portion. The discharging of the capacitor tends to reduce the strength of the magnetic field but this is offset by movement of the movable core portion toward the stationary portion. The magnetic field is increased until the field strength reaches a predetermined value when the capacitor is completely discharged and the movable core is fully retracted.

DETAILED DESCRIPTION

Figure 1A:
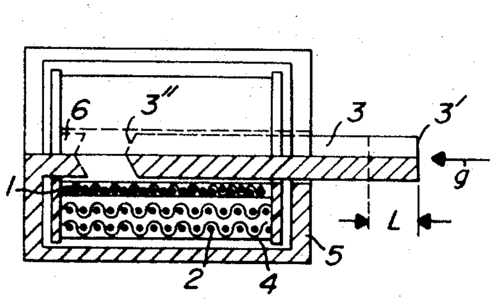
FIG. 1*a* is a partially sectioned side view of a starting solenoid taken along the line 1*a*—1*a* of FIG. 1*b*, employed in the solenoid energizing circuit according to the invention.
Figure 1B:
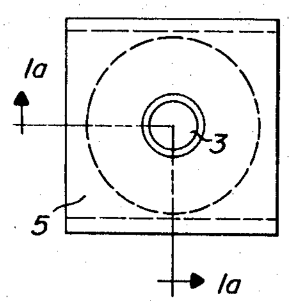
FIG. 1*b* is an end view of the solenoid of FIG. 1*a*.

Referring now to the drawing wherein like numerals have been employed for similar parts throughout the various views, a solenoid of the type employable in the energizing circuit according to the invention is illustrated in FIG. 1. The solenoid includes a bobbin 4, a core housing 5 having one end surface thereof including an aperture through which a movable core 3 passes. The opposite end of the core has a stationary core portion 6 mounted therein. Movement of head 3' of the movable core 3 to the left as seen in FIG. 1, a distance L, moves the end 3'' of the movable core 3 into contacting engagement with stationary core portion 6. The distance L is the distance the core 3 is required to move in operation of the solenoid.

Figure 2:
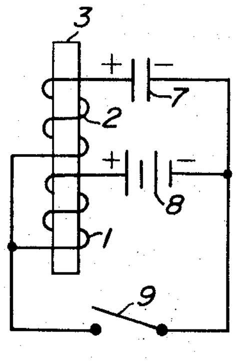
FIG. 2 is a schematic diagram of the solenoid energizing circuit according to the invention.

Operating coils 1 and 2 of the solenoid are connected as shown in FIG. 2. Coil 1 is connected through a switch 9 to a DC power supply 8 and coil 2 is connected to a capacitor 7, such as, for example, an electrolytic capacitor having very low current leakage, through switch 9.

Figure 3A:
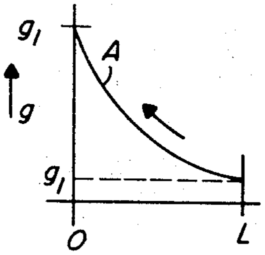
FIGS. 3*a*, 3*b* and 3*c* are graphs illustrating the operating characteristics of the preferred embodiment of the solenoid when energized by the circuit according to the invention.

Referring to the graph of FIG. 3*a*, it can be seen that the magnetic field provided to core 3 by the flow of currently only through coil 1 (gl) is small when applied if the core 3 is spaced from core portion 6 by gap L and at the magnetic field or force is increased (g2) when the core 3 is moved into contacting engagement with core portion 6 to reduce the gap to zero. The circuit of the invention has been provided to increase the initial force or magnetic field to core 3.

Figure 3B:
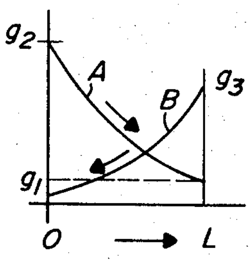
Figure 3C:
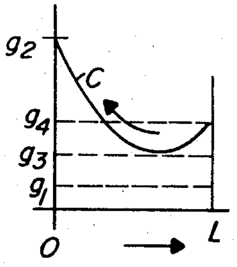

According to the invention, coil 2 is added to coil 1 and is positioned in axial alignment therewith. Coil 2 is connected through switch 9 to capacitor 7. The number of turns of coil 2 is determined by the size of capacitor 7. Normally, switch 9 is open and capacitor 7 is charged by power supply 8. With switch 9 open, the resulting magnetic field in coils 1 and 2 is zero since the coils are effectively opposing each other magnetically. When switch 9 is closed, capacitor 7 discharges. Initially, a large current therefrom flows through coil 2 to provide a relatively large magnetic field to core 3. As the capacitor discharges, however, the field decreases. The latter is shown by curve B in FIG. 3*b*. Since upon closing switch 9 coils 1 and 2 are connected so that the magnetic fields produced at core 3 coincide, or are in aiding relation, the combined magnetic field from both coils becomes the sum of A and B of FIG. 3*b* to produce the curve shown in 3*c*. Thus, upon initially closing switch 9, the magnetic force or field provided to core 3 is equal to gl + g3 or g4. Therefore, even if the gap between core 3 and core portion 6 is large, the large magnetic force provided thereto can easily move the core 3 sufficiently to operate a tape head or the like indexing assembly in a tape player.

The magnetic force or field provided by the combination included in the circuit of the invention is greater initially than that (gl) provided only by the DC power supply and coil. It is also maintained greater during the intermediate operation of the solenoid and ultimately provides an equally great magnetic field (g2).

Using the circuit of the invention permits, in turn, the use of a smaller DC power supply to provide initially a large magnetic field for operation of the solenoid.

While the energizing circuit has been described in conjunction with a solenoid which when operated causes the movement of a movable core 3 thereof toward a stationary core portion 6, the energizing circuit will operate equally as well to provide an increased initial magnetic field strength to a solenoid which when operated, causes movement of the core outwardly therefrom.

In both cases, the initial magnetic field strength is increased due to the addition of the current flow from both the DC power supply and the charged capacitor.

I claim:

1. An energizing circuit for a solenoid including in combination:

electromagnetic coil means for said solenoid having first and second coil portions, each of said coil portions having first and second ends, with the first ends of said coil portions being connected at a common point; a source of DC power having first and second terminals, said first terminal being connected with the second end of said first coil portion; capacitor means connected electrically in series between the second terminal of said power source and the second end of said second coil portion; switch means connected electrically between the second terminal of said power source and said common point, said first and second coil portions being wound in a magnetically opposing relation in a charging path for said capacitor means with said switch means open, closure of said switch means causing said capacitor means to discharge through said second coil portion in magnetically aiding relation with said first coil portion.

2. An energizing circuit as claimed in claim 1 wherein said solenoid includes a movable core portion and a stationary core portion, wherein said movable core portion is positioned normally a predetermined distance from said stationary core portion and upon energization of said coil means is moved toward said stationary core portion and wherein upon energization of said coil means, a magnetic field of a predetermined strength is produced in said coil means, said field strength tending to be diminished by the discharge of said capacitor and increased by the movement of said movable core portion toward said stationary core portion to maintain said field above a second predetermined strength.

* * * * *